United States Patent
Yoo et al.

(10) Patent No.: US 8,144,553 B2
(45) Date of Patent: Mar. 27, 2012

(54) DISK DRIVE

(75) Inventors: Ho-Jun Yoo, Suwon-si (KR);
Kyung-Seob Shin, Ansan-si (KR);
Sang-Kyu Lee, Suwon-si (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 546 days.

(21) Appl. No.: 12/318,751

(22) Filed: Jan. 7, 2009

(65) Prior Publication Data

US 2009/0262449 A1    Oct. 22, 2009

(30) Foreign Application Priority Data

Apr. 17, 2008  (KR) .................. 10-2008-0035649

(51) Int. Cl.
*G11B 33/14*    (2006.01)
*G11B 7/00*    (2006.01)

(52) U.S. Cl. ................... 369/44.32; 369/244.1; 720/660

(58) Field of Classification Search ............... 360/97.02; 369/44.32

See application file for complete search history.

(56) References Cited

U.S. PATENT DOCUMENTS

| | | | | |
|---|---|---|---|---|
| 5,099,468 A | * | 3/1992 | Suzuki et al. | 369/44.32 |
| 5,289,449 A | * | 2/1994 | Han | 369/53.29 |
| 5,889,638 A | * | 3/1999 | Kabasawa et al. | 360/261.3 |
| 7,334,245 B2 | * | 2/2008 | Yasukawa et al. | 720/669 |
| 7,573,800 B2 | * | 8/2009 | Fukakusa et al. | 369/112.19 |
| 2002/0114106 A1 | * | 8/2002 | Kohyama et al. | 360/99.06 |
| 2003/0123373 A1 | * | 7/2003 | Sogawa | 369/112.23 |
| 2006/0066974 A1 | * | 3/2006 | Akamatsu et al. | 360/69 |
| 2007/0076088 A1 | * | 4/2007 | Shimada et al. | 347/224 |
| 2008/0301725 A1 | * | 12/2008 | Escobar-Bowser et al. | 720/658 |
| 2010/0242057 A1 | * | 9/2010 | Ou et al. | 720/696 |

FOREIGN PATENT DOCUMENTS

| | | |
|---|---|---|
| JP | 9-84299 | 3/1997 |
| KR | 10-2005-0105637 | 11/2005 |
| KR | 10-2007-0024102 | 3/2007 |

OTHER PUBLICATIONS

Korean Office Action issued on Jul. 22, 2009 in corresponding Korean Patent Application 10-2008-0035649.

* cited by examiner

*Primary Examiner* — Son Mai

(57) ABSTRACT

A disk drive for driving a disk is disclosed, which includes: a driving unit configured to provide a driving force onto the disk, a main circuit pattern electrically connected with the driving unit, a sensor unit configured to sense a rotation speed of the disk, a first board supporting the sensor unit, a second board supporting the first board, and a base plate supporting the second board and the driving unit. One of the first board and the second board can be a flexible board electrically connecting the sensor unit with the main circuit pattern, and the other of the first board and the second board can be a rigid board. This disk drive can be utilized to ensure the distance between the sensor unit and the disk required for a rotation sensor to measure the rotation speed of the disk.

9 Claims, 9 Drawing Sheets

DISK DRIVE

CROSS-REFERENCE TO RELATED APPLICATIONS

This application claims the benefit of Korean Patent Application No. 10-2008-0035649 filed with the Korean Intellectual Property Office on Apr. 17, 2008, the disclosure of which is incorporated herein by reference in its entirety.

BACKGROUND

1. Technical Field

The present invention relates to a disk drive.

2. Description of the Related Art

In addition to the traditional functions of reading and writing data, current disk drives available in the market provide an on-disk printing function (e.g. light-scribing), which is to record a photo, picture, or text, etc., desired by the user on the opposite side of the data-recording surface. In order to implement this on-disk printing function, it may be necessary to rotate a disk at a relatively low speed, unlike the typical modes for reading or recording data.

Whereas a disk drive in a desktop computer may generally rotate at about 10,500 rpm, and a disk drive in a laptop may rotate at about 5,400 rpm, a disk drive performing an on-disk printing function may rotate at a low speed of about 40 to 800 rpm. This may be due to technical limitations, as the on-disk printing technique, for burning the surface of a plastic disk using the laser diode of the optical pickup unit to print a desired photo, picture, or text, may not support high-speed rotations.

FIG. 1 is a cross sectional view of a disk drive according to the related art. As shown in FIG. 1, in order to operate the disk drive at a constant low speed, an encoder 140 for measuring the rotation speed of the spindle motor 100 may be mounted on a resin mold 130. However, in order for the encoder 140 to measure the rotation speed, a particular distance from the disk 10 may be required. Because of the various sizes in which the current disk drive 1000 is being produced, there may be difficulties in providing a particular distance between the encoder 140 and the disk 10.

SUMMARY

An aspect of the invention provides a disk drive that ensures the distance required for a rotation sensor to measure the rotation speed of the disk.

Another aspect of the invention provides a disk drive for driving a disk that includes: a driving unit configured to provide a driving force onto the disk, a main circuit pattern electrically connected with the driving unit, a sensor unit configured to sense a rotation speed of the disk, a first board supporting the sensor unit, a second board supporting the first board, and a base plate supporting the second board and the driving unit. Here, one of the first board and the second board can be a flexible board electrically connecting the sensor unit with the main circuit pattern, and the other of the first board and the second board can be a rigid board.

The rigid board may be inserted in a hole formed in the base plate. The disk drive may include multiple flexible boards, where the flexible boards may be stacked over one another. The first board can be a flexible board, while the second board can be a rigid board. Alternately, the first board can be a rigid board, and the second board can be a flexible board.

The sensor unit and the flexible board can be electrically connected by a through-hole formed in the rigid board.

The disk drive may further include a thermosetting adhesive film positioned between the flexible board and the rigid board.

The flexible board can include a conductive layer and a coverlay, with the coverlay covering the conductive layer. The coverlay can expose a portion of the conductive layer, making it possible to electrically connect the conductive layer with the main circuit pattern. A portion of the flexible board and the main circuit pattern can be soldered together, or a socket can be formed in the main circuit pattern, with a portion of the flexible board may be inserted in the socket.

Additional aspects and advantages of the present invention will be set forth in part in the description which follows, and in part will be obvious from the description, or may be learned by practice of the invention.

DETAILED DESCRIPTION

Figure 1:
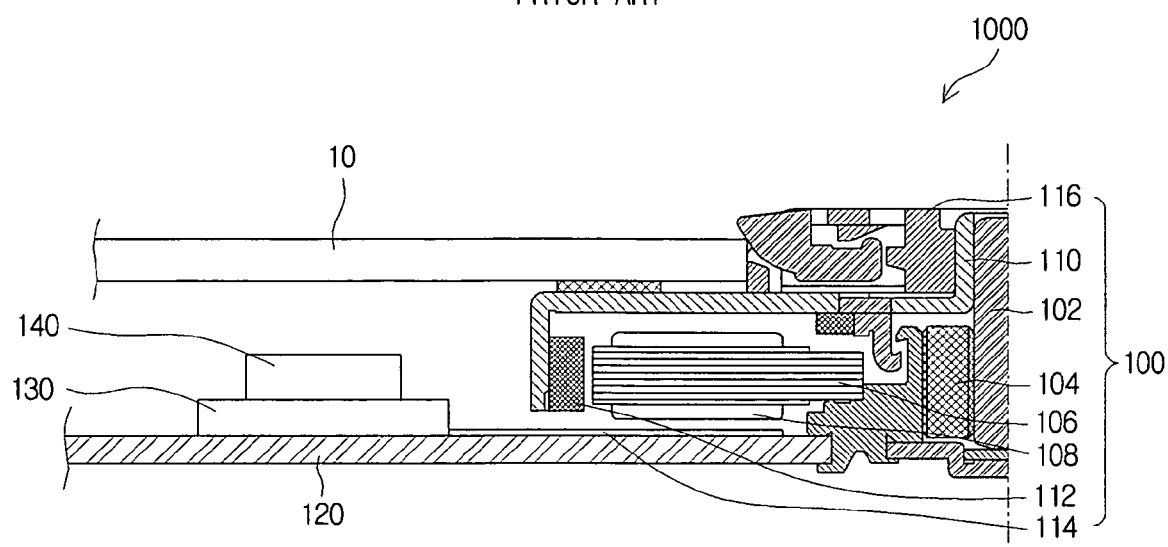
FIG. 1 is a cross sectional view illustrating a disk drive according to the related art.

The disk drive according to certain embodiments of the invention will be described below in more detail with reference to the accompanying drawings. Those components that are the same or are in correspondence are rendered the same reference numeral regardless of the figure number, and redundant explanations are omitted.

Figure 2:
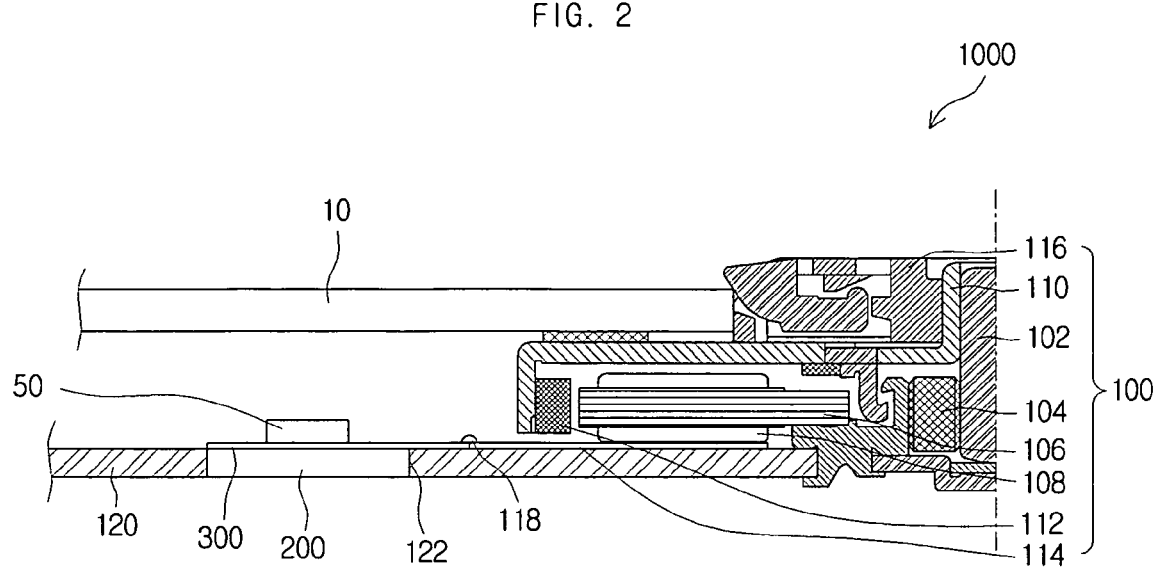
FIG. 2 is a cross sectional view illustrating a disk drive according to a first disclosed embodiment of the invention.
Figure 3:
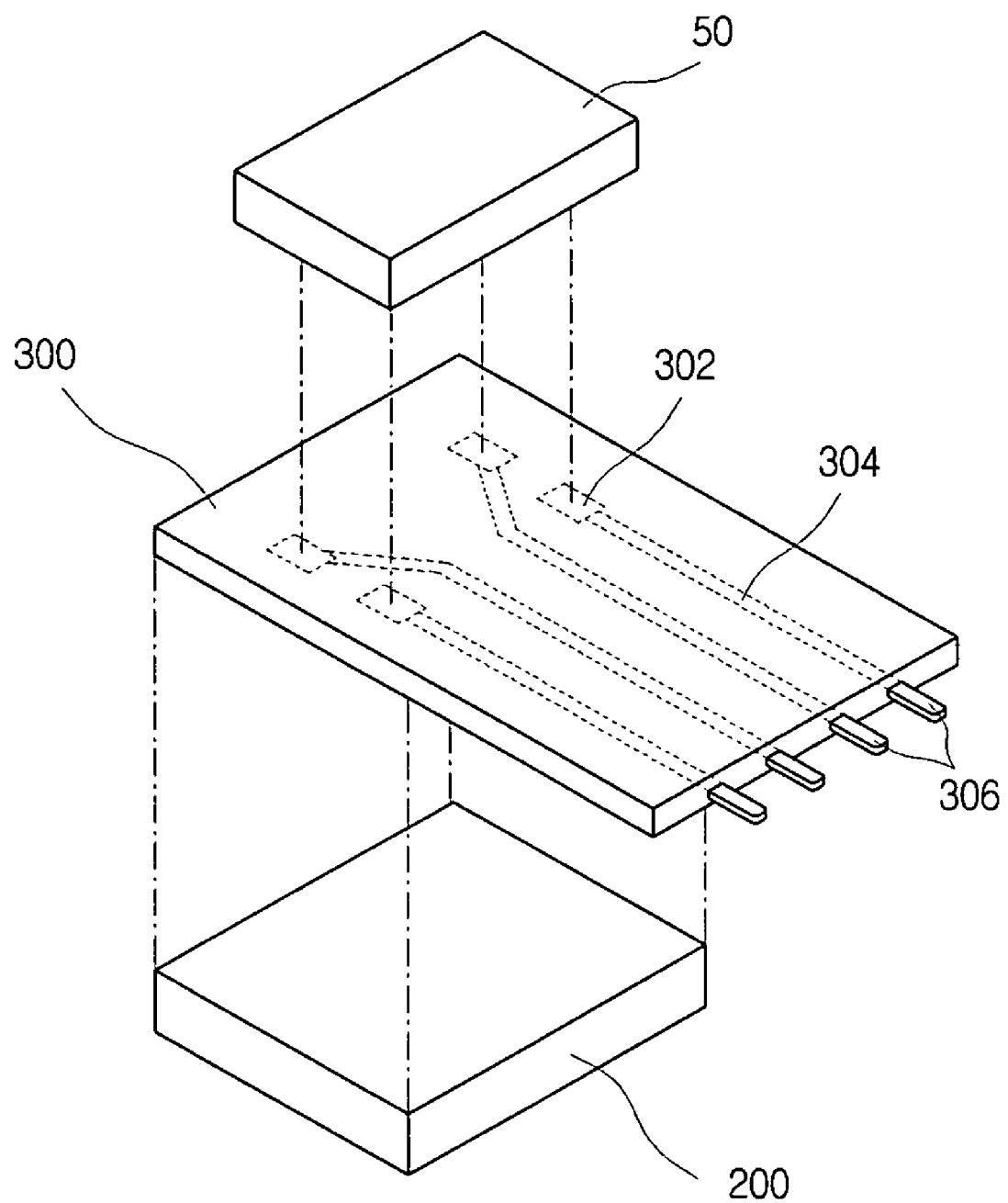
FIG. 3 is an exploded perspective view illustrating the sensor unit and the rigid and flexible boards of a disk drive according to the first disclosed embodiment of the invention.
Figure 4:
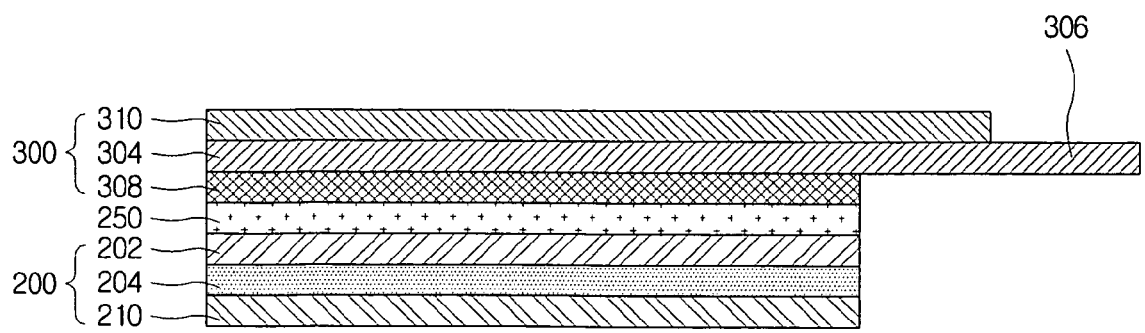
FIG. 4 is a cross sectional view illustrating portions of the rigid and flexible boards of a disk drive according to the first disclosed embodiment of the invention.

FIG. 2 is a cross sectional view illustrating a disk drive according to a first disclosed embodiment of the invention, FIG. 3 is an exploded perspective view illustrating the sensor unit and the rigid and flexible boards of a disk drive according to the first disclosed embodiment of the invention, and FIG. 4 is a cross sectional view illustrating portions of the rigid and flexible boards of a disk drive according to the first disclosed embodiment of the invention. In FIGS. 2 to 4, there are illustrated a disk 10, an encoder 50, a spindle motor 100, a shaft 102, a bearing 104, a stator 106, a coil 108, a rotor 110, a magnet 112, a main board 114, a disk chucking device 116, a base plate 120, a hole 122, solder 118, a rigid board 200, a thermosetting adhesive film 250, a flexible board 300, lands 302, conductive layers 204, 304, leads 306, a base layer 308, coverlays 210, 310, an epoxy resin layer 202, and a disk drive 1000.

A disk drive 1000 based on the first disclosed embodiment of the invention can be a device for driving a disk 10. The disk drive 1000 can include a driving unit configured to provide a driving force to the disk 10, a main circuit pattern electrically connected with the driving unit, a sensor unit configured to sense the rotation speed of the disk 10, a flexible board 300 supporting the sensor unit, a rigid board 200 supporting the flexible board 300, and a base plate 120 supporting the rigid board 200 and the driving unit. The rigid board 200 can be inserted in a hole 122 formed in the base plate 120, so as to provide the particular distance between the sensor unit and the disk 10 required by the sensor unit for measuring the rotation speed of the disk 10.

As illustrated in FIG. 2, the disk drive 1000 can be a device that receives a disk 10 on one side and drives the disk 10. The disk drive 1000 can be equipped with an on-disk printing function for labeling a disk using the laser beam of the optical pickup unit, and can be utilized in an optical disk drive (ODD).

The disk 10 can be a medium for recording information, where the information may be stored on its lower surface, and a design selected by the user may be formed on its upper surface. Also, an identifier mark can be formed in a position corresponding to an encoder 50, which will be described later in further detail, where the identifier mark may be used by the encoder 50 in measuring the rotation speed of the disk 10.

The driving unit can be the part that provides a driving force onto the disk 10 in a high speed or a low speed. The driving unit may include a spindle motor 100. A disk chucking device 116 can be coupled on to an upper side of the spindle motor 100. The disk chucking device 116 may be coupled to the shaft 102 for the coupling with the spindle motor 100. The disk chucking device 116 may support the disk 10 in a manner that allows the disk 10 to be mounted and dismounted.

The spindle motor 100 can include a rotor 110 and a stator 106. The rotor 110, which can be coupled to the shaft 102, can be the portion that is rotated when the magnetic field formed by the magnets 112 interacts with the stator 106. The magnets 112 and the stator 106 can be positioned opposite each other.

The shaft 102 can be coupled with the rotor 110 and can be rotatably supported by a bearing 104.

Coils 108 may be wound on portions of the stator 106, so that when an electric current is applied to the coils 108, a magnetic field may be generated which interacts with the magnets 112. The stator 106 can be supported by the base plate 120 and can be coupled to the outer perimeter of the bearing 104.

The main circuit pattern can be electrically connected with the driving unit and the sensor unit. The main circuit pattern can be formed on the main board 114. The main circuit pattern can form an electrical connection with the spindle motor 100, to transfer the rotation speed of the spindle motor 100 measured by the sensor unit to a control unit (not shown), so that the spindle motor 100 may be controlled accordingly.

The sensor unit may be such that is capable of sensing the rotation speed of the disk 10. The sensor unit can include an encoder 50, which in turn may include a light-emitting part and a light-receiving part. Using the identifier mark formed on the disk 10, the rotation speed of the disk 10 can be detected, whereby the rotation speed of the spindle motor 100 can be measured.

In order to sense the rotation speed of the disk 10, the encoder 50 can be installed in a position corresponding with the identifier mark of the disk 10. Here, a particular distance may be required between the encoder 50 and the disk 10.

The base plate 120 can support the spindle motor 100, and a hole 122 can be formed in the base plate 120, in which the rigid board 200 may be inserted. The base plate 120 can be of a steel material. Forming the hole 122 in the base plate 120 may ensure the distance between the disk 10 and the encoder 50 required for the encoder 50 to measure the rotation speed of the disk 10, while providing a smaller thickness for the disk drive 1000. The rigid board 200 can be secured to the inner perimeter of the hole 122 using adhesive, etc.

As illustrated in FIG. 3, the flexible board 300 can support the encoder 50, while the rigid board 200 can support the flexible board 300. Terminals (not shown) for electrical connection can be formed on the lower side of the encoder 50. To implement the electrical connection with the terminals of the encoder 50, the flexible board 300 can include lands 302, which may contact the terminals of the encoder 50, and circuit patterns. In other words, a conductive layer 304 can be formed in the flexible board 300.

As illustrated in FIG. 4, the flexible board 300 can include a base layer 308, which may confer a flexible quality, a conductive layer 304, which may contain copper, and a coverlay 310, which may cover the conductive layer 304. The conductive layer 304 can provide electrical connection with the terminals of the encoder 50.

The coverlay 310 can expose portions of the conductive layer 304, so as to allow electrical connections between the conductive layer 304 and the main board 114. Leads 306 can be formed on the exposed portions of the conductive layer 304. The leads 306 may be connected to the main board 114 by way of solder 118, for example, as illustrated in FIG. 2.

A thermosetting adhesive film 250 can be placed between the flexible board 300 and the rigid board 200, in which case the flexible board 300 and rigid board 200 may be attached to each other by hot pressing.

By forming an electrical connection with the main board 114 by way of the flexible board 300, the encoder 50 can be mounted on the base plate 120 in a desired position, without having to form a separate pattern on the main board 114 for electrical connecting the encoder 50.

The rigid board 200 can include an epoxy resin layer 202, which may confer a rigid quality, a conductive layer 204, which may contain copper, and a coverlay 210, which may cover the conductive layer 204. The epoxy resin layer 202 can be made, for example, from a thermally resistant epoxide compound or glass compound. The rigid board 200 can support the flexible board 300, and also provide support for the encoder 50 in such a way that secures the encoder 50 over the hole 122. The rigid board 200 of this particular embodiment may be formed with the through-hole 212 omitted.

The rigid board 200 can be fabricated in a standardized form with a constant thickness, and this rigid board 200 can be used as a support for the encoder 50. Thus, the problems of increased cost, caused by having to use expensive molds when mass-producing supports for the encoder 50, can be resolved.

Figure 5:
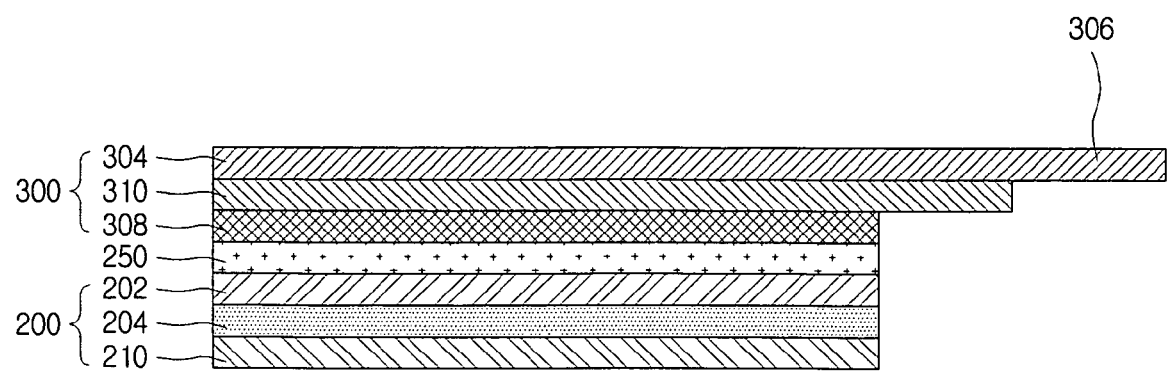
FIG. 5 is a cross sectional view illustrating portions of the rigid and flexible boards of a disk drive according to a second disclosed embodiment of the invention.

FIG. 5 is a cross sectional view illustrating portions of the rigid and flexible boards 200, 300 of a disk drive 1000 according to a second disclosed embodiment of the invention. In this embodiment, according to the coupling relationship between the flexible board 300 and the main board 114, the coverlay 310 may cover the conductive layer 304 such that the lower side of a portion of the conductive layer 304 is exposed. The portion of the conductive layer 304 that is exposed may vary according to the arrangement relative to the main board 114.

Figure 6:
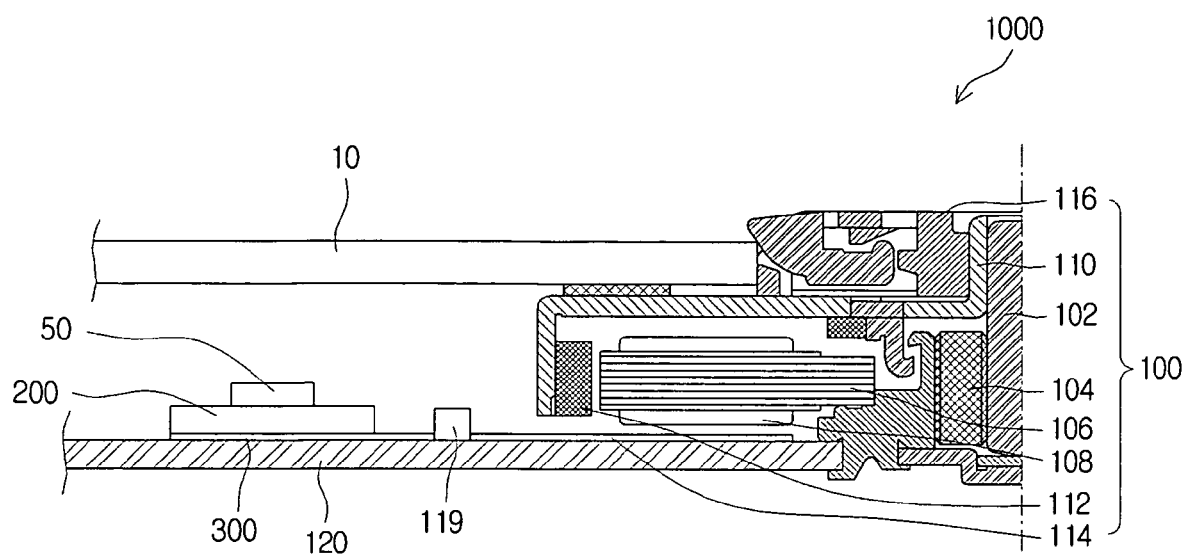
FIG. 6 is a cross sectional view illustrating a disk drive according to a third disclosed embodiment of the invention.
Figure 7:
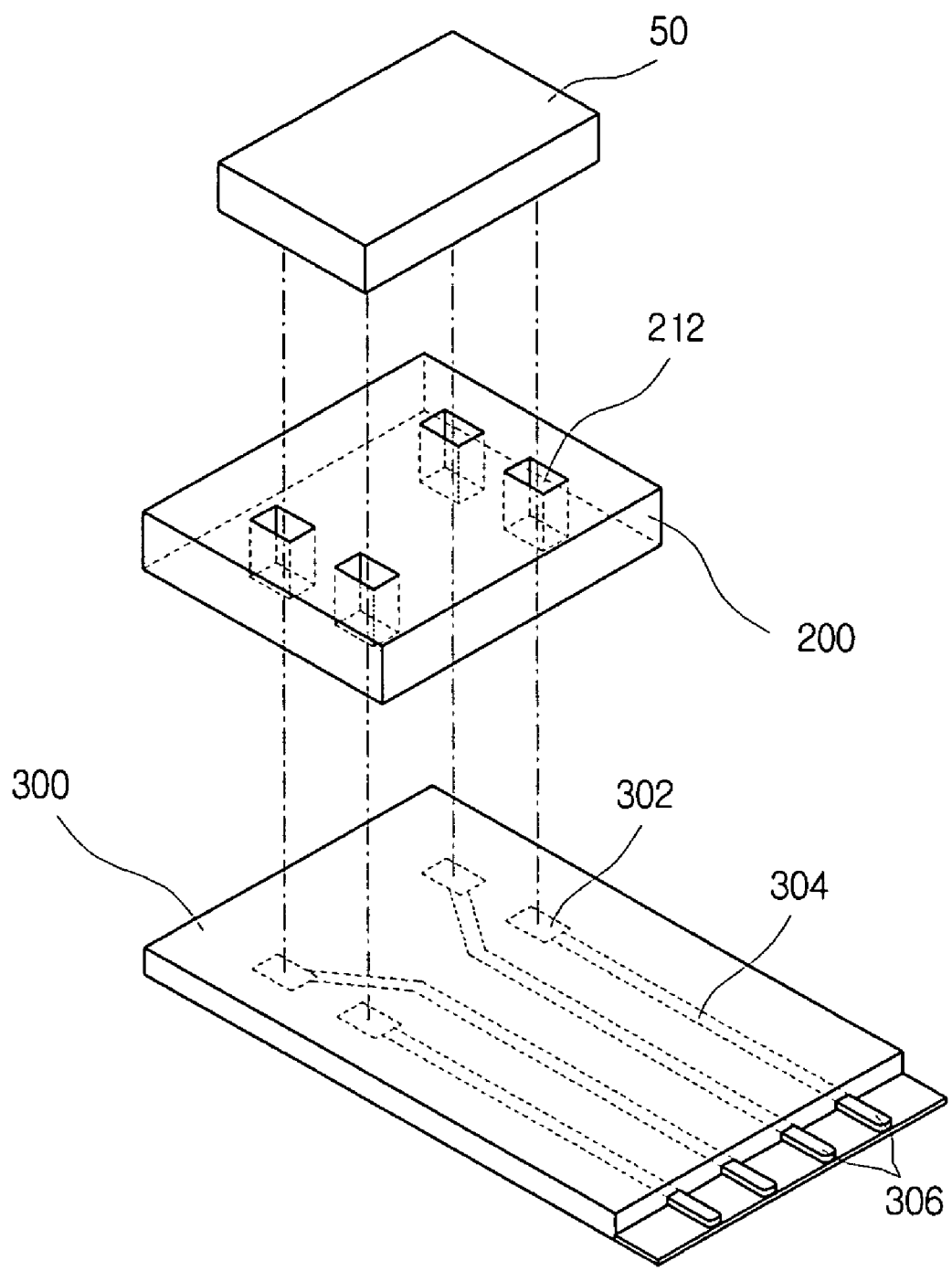
FIG. 7 is an exploded perspective view illustrating the rigid and flexible boards of a disk drive according to the third disclosed embodiment of the invention.
Figure 8:
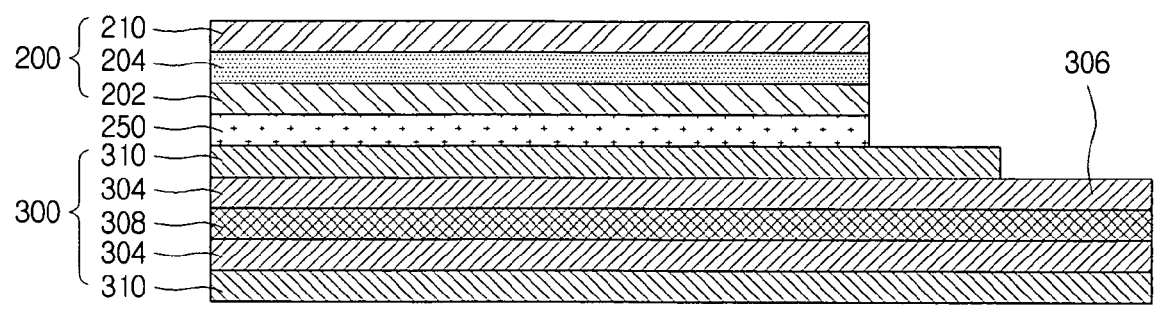
FIG. 8 is a cross sectional view illustrating portions of the rigid and flexible boards of a disk drive according to the third disclosed embodiment of the invention.

FIG. 6 is a cross sectional view illustrating a disk drive 1000 according to a third disclosed embodiment of the invention, FIG. 7 is an exploded perspective view illustrating the rigid and flexible boards 200, 300 of a disk drive 1000 according to the third disclosed embodiment of the invention, and FIG. 8 is a cross sectional view illustrating portions of the rigid and flexible boards 200, 300 of a disk drive 1000 according to the third disclosed embodiment of the invention.

As illustrated in FIG. 6, a disk drive 1000 based on this embodiment can include an encoder 50, a rigid board 200 supporting the encoder 50, and a flexible board 300 supporting the rigid board 200, so that the encoder 50 may be mounted over the base plate 120 at a desired height.

As illustrated in FIG. 7, through-holes 212 can be formed in the rigid board 200, to provide electrical connections between the encoder 50 and the flexible board 300. The lower end of a through-hole 212 can be in contact with a land 302 on the flexible board 300, while the upper end can be electrically connected with a terminal of the encoder 50. The through-hole 212 can be a hole formed for electrical connection, where a conductive metal can be plated over the inner walls of the hole.

As illustrated in FIG. 8, multiple flexible boards 300 can be included, which may be stacked over one another. The flexible boards 300 can include multiple conductive layers 304 and coverlays 310 over each side of a base layer 308, which provides the flexible quality.

The rigid board 200 and the flexible board 300 can be fabricated in standardized sizes, and the standardized rigid board 200 and flexible board 300 can be used in combination to mount the encoder 50 at a desired height. As in this particular embodiment, the flexible board 300, which may be relatively thinner than the rigid board 200, can be stacked in multiple numbers, to finely adjust the height of the encoder 50.

It is also possible to adjust the mounting height of the encoder 50 by adjusting the thickness of the thermosetting adhesive film 250 interposed between the flexible board 300 and rigid board 200 or by adjusting the level of pressing applied to the thermosetting adhesive film 250.

The base layer 308 and the coverlay 310 can be stacked below the lead 306. A socket 119, which can be electrically connected with the main board 114, may include holes in which to insert the leads 306. Using this structure, the leads 306 can be inserted into the socket 119, to form direct electrical connections with the main board 114. As such, an increased degree of freedom may be provided in planning the arrangement of the spindle motor 100 and the encoder 50 in the disk drive 1000.

Figure 9:
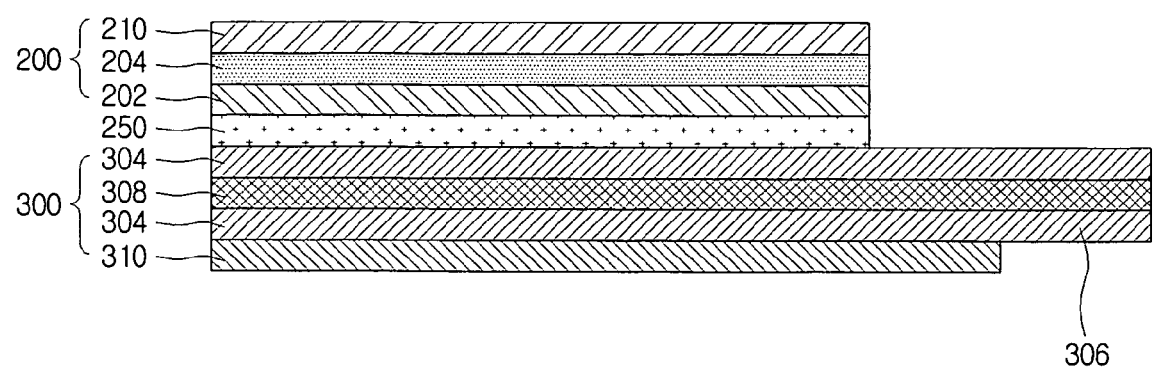
FIG. 9 is a cross sectional view illustrating portions of the rigid and flexible boards of a disk drive according to a fourth disclosed embodiment of the invention.

FIG. 9 is a cross sectional view illustrating portions of the rigid and flexible boards 200, 300 of a disk drive 1000 according to a fourth disclosed embodiment of the invention. In this embodiment, according to the coupling relationship between the flexible board 300 and the main board 114, the leads 306 may be exposed towards the lower surface of the flexible board 300, in contrast to the third disclosed embodiment described above. The leads 306, formed by exposing portions of the conductive layer 304, may vary in form according to the arrangement relative to the main board 114.

While the spirit of the invention has been described in detail with reference to particular embodiments, the embodiments are for illustrative purposes only and do not limit the invention. It is to be appreciated that those skilled in the art can change or modify the embodiments without departing from the scope and spirit of the invention.

What is claimed is:

1. A disk drive for driving a disk, the disk drive comprising:
a driving unit configured to provide a driving force onto the disk;
a main circuit pattern electrically connected with the driving unit;
a sensor unit configured to sense a rotation speed of the disk;
a first board supporting the sensor unit;
a second board supporting the first board;
a base plate supporting the second board and the driving unit; and
a plurality of flexible boards, the flexible boards being stacked over one another,
wherein one of the first board and the second board is a flexible board electrically connecting the sensor unit with the main circuit pattern, and the other of the first board and the second board is a rigid board.

2. The disk drive of claim 1, wherein the rigid board is inserted in a hole formed in the base plate.

3. The disk drive of claim 1, wherein the first board is a flexible board, and the second board is a rigid board.

4. The disk drive of claim 1, wherein the first board is a rigid board, and the second board is a flexible board.

5. The disk drive of claim 4, wherein the sensor unit and the flexible board are electrically connected by a through-hole formed in the rigid board.

6. A disk drive for driving a disk, the disk drive comprising:
a driving unit configured to provide a driving force onto the disk;
a main circuit pattern electrically connected with the driving unit;
a sensor unit configured to sense a rotation speed of the disk;
a first board supporting the sensor unit;
a second board supporting the first board; and
a base plate supporting the second board and the driving unit,
wherein one of the first board and the second board is a flexible board electrically connecting the sensor unit with the main circuit pattern, and the other of the first board and the second board is a rigid board, and
a thermosetting adhesive film is interposed between the flexible board and the rigid board.

7. A disk drive for driving a disk, the disk drive comprising:
a driving unit configured to provide a driving force onto the disk;
a main circuit pattern electrically connected with the driving unit;
a sensor unit configured to sense a rotation speed of the disk;
a first board supporting the sensor unit;
a second board supporting the first board; and
a base plate supporting the second board and the driving unit,
wherein one of the first board and the second board is a flexible board electrically connecting the sensor unit with the main circuit pattern, and the other of the first board and the second board is a rigid board,
the flexible board comprises a conductive layer and a coverlay covering the conductive layer, and
the coverlay exposes a portion of the conductive layer such that the conductive layer is electrically connectable with the main circuit pattern.

8. The disk drive of claim 7, wherein a portion of the flexible board and the main circuit pattern are soldered together.

9. The disk drive of claim 7, wherein the main circuit pattern comprises a socket formed therein, and a portion of the flexible board is inserted in the socket.

* * * * *